(No Model.)
R. R. STAFFORD.
MEANS FOR DISPENSING EFFERVESCENT LIQUIDS.
No. 263,614. Patented Aug. 29, 1882.
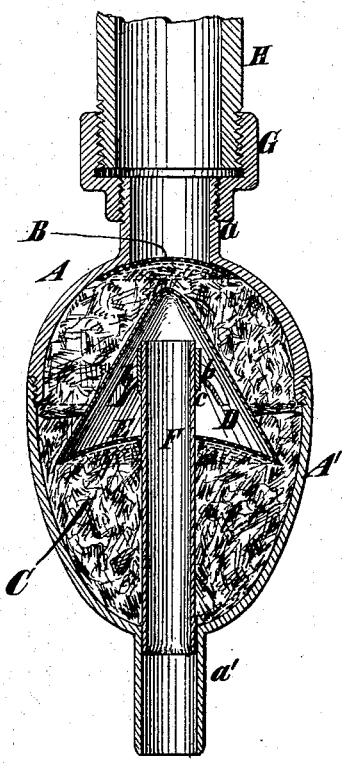
Witnesses
T. J. Keane
James R. Bowen.
Inventor
R. R. Stafford
By his Atty
Edwin H. Brown

United States Patent Office.

RINALDO R. STAFFORD, OF PORT RICHMOND, NEW YORK, ASSIGNOR OF ONE-HALF TO GEORGE H. DOBBIN, OF SAME PLACE.

MEANS FOR DISPENSING EFFERVESCENT LIQUIDS.

SPECIFICATION forming part of Letters Patent No. 263,614, dated August 29, 1882.

Application filed May 27, 1882. (No model.)

*To all whom it may concern:*

Be it known that I, RINALDO R. STAFFORD, of Port Richmond, in the county of Richmond and State of New York, have invented a certain new and useful Improvement in Means for Dispensing Effervescent Liquids, of which the following is a specification.

The object of my improvement is to provide a convenient means whereby effervescent liquids may be dispensed with as little spurting and foaming as possible. I desire also to make the same in such form as will admit of application to any ordinary faucet.

The improvement consists in the combination of an egg-shaped vessel filled with sponge or other suitable material and an inlet and outlet for the liquid.

The improvement also consists in the combination of a vessel provided with an inlet and outlet, a conical or conoidal spreader arranged opposite the inlet and supported upon the outlet, and a perforated diaphragm at the lower end of the spreader.

The improvement also consists in the combination of an egg-shaped vessel provided with an inlet and an outlet pipe extending upwardly from the bottom, a conical or conoidal spreader arranged opposite the inlet and supported upon the outlet-pipe, and a perforated diaphragm at the lower part of the spreader.

The accompanying drawing is a central longitudinal section of a device embodying my improvement, the mouth portion of a faucet, and a reducer connecting the device to the faucet.

A A' designate a vessel, made of metal or other suitable material, and of the form of an egg, the larger end or the portion of the larger diameter being uppermost. It is made in two parts, which are united by means of an externally-screw-threaded rim on the one engaging with a screw-thread in the edge portion of the other. The upper part, A, has an inlet passage or duct, *a*, leading to it, and the lower part, A', has an outlet passage or duct, *a'*, extending from it. Within the upper part, just below the inlet *a*, is a disk, B, of perforated sheet metal or wire-gauze, and below this disk is a filling of sponge, C, or other suitable material.

D designates a spreader of conical or conoidal form, made of sheet metal or other appropriate material, and arranged with its apex opposite the inlet *a*. It extends down to about the middle portion of the vessel, and preferably has applied to or placed under the bottom a disk of perforated sheet metal or wire-gauze, E. As here shown, this spreader is attached by arms *b* to a ring or socket, *c*, which is fitted to a tube, F, extending up from the outlet *a'*. The ring or socket may be retained on the tube by friction only, so as to be readily detachable, and the tube may be similarly secured in place within the outlet *a'*. The inlet *a* is externally screw-threaded, and has in this instance applied to it a reducer, G, whereby it is secured to the mouth of a faucet, H. It may, however, be screwed directly into the mouth of a faucet in many cases. The stream of liquid entering the vessel A A' comes in contact with the spreader and is deflected into a film, which, after flowing to the lower part of the vessel, ultimately rises around the outlet-tube and flows into and escapes through the same. The shape of the vessel allows the liquid, on entering it, a sudden relief, and then gradually concentrates it until it rises and escapes through the outlet-tube. The liquid escapes in a quiescent state without sputtering, and hence may be drawn with little or no care and as rapidly as possible. Obviously the liquid will be filtered in passing through the vessel.

The construction and combination of the parts are such that they may be easily separated for the purpose of cleaning them and washing the sponge.

The device will also have advantages as a filter for liquids which are not of an effervescent character.

What I claim as my invention, and desire to secure by Letters Patent, is—

1. The combination, in a device for dispensing liquids, of an egg-shaped vessel filled with sponge or other suitable material and an inlet and outlet for the liquid, substantially as specified.

2. The combination, in a device for dispensing liquids, of a vessel, a conical or conoidal spreader arranged opposite the inlet thereof and supported on the outlet, and a perforated diaphragm at the lower end of the spreader, substantially as specified.

3. The combination, in a device for dispensing liquids, of an egg-shaped vessel provided with an inlet and an outlet pipe extending upwardly from the bottom, a conical or conoidal spreader arranged opposite the inlet and supported upon the outlet-pipe, and a perforated diaphragm at the lower part of the spreader, substantially as specified.

4. The combination of the vessel A A', having the inlet and outlet $a$ $a'$, the disks B E, the outlet-tube F, slipped into the outlet $a'$, and the spreader D, slipped over the tube F, all substantially as specified.

RINALDO R. STAFFORD.

Witnesses:
T. J. KEANE,
JAMES R. BOWEN.